United States Patent [19]

Reyhan et al.

[11] Patent Number: 5,382,752

[45] Date of Patent: Jan. 17, 1995

[54] ELECTRICAL JUNCTION BOX AND METHOD OF MAKING

[75] Inventors: Frederick B. Reyhan, Diamond Bar; Gary H. Kermoian, Corona; Richard J. Kesl, Yorba Linda; Gary K. Weise, Irvine, all of Calif.

[73] Assignee: Thermocraft Industries, Inc., Corona, Calif.

[21] Appl. No.: 976,909

[22] Filed: Nov. 16, 1992

[51] Int. Cl.⁶ .............................................. H05K 5/00
[52] U.S. Cl. ........................................ 174/50; 174/38; 174/51; 174/65 R
[58] Field of Search ................... 174/38, 50, 51, 65 R

[56] References Cited

U.S. PATENT DOCUMENTS

| | | | |
|---|---|---|---|
| 1,860,829 | 5/1932 | Abbott | 174/51 |
| 1,880,081 | 9/1932 | Frederickson | 174/51 |
| 3,557,299 | 1/1971 | Dienes | 174/38 |
| 3,769,443 | 10/1973 | Pierzchala et al. | 174/38 |
| 3,772,453 | 11/1973 | O'Brien | 174/65 SS |
| 4,339,231 | 7/1982 | Conery et al. | 417/40 |
| 4,574,337 | 3/1986 | Poppenheimer | 362/267 |
| 4,654,470 | 3/1987 | Feldman et al. | 174/50 |
| 4,789,759 | 12/1988 | Jones | 174/65 SS |
| 4,835,667 | 5/1989 | Wolfe | 362/276 |
| 4,859,812 | 8/1989 | Klosin et al. | 174/135 |
| 4,959,506 | 9/1990 | Petty et al. | 174/65 R |
| 5,142,102 | 8/1992 | Michie | 174/50 |
| 5,147,980 | 9/1992 | Ferguson, Jr. | 174/37 |

Primary Examiner—Leo P. Picard
Assistant Examiner—David Tone
Attorney, Agent, or Firm—Poms, Smith, Lande & Rose

[57] ABSTRACT

An electrical junction box for swimming pool light fixtures includes a metallic base plate and a polymer cover member. the base plate includes lower conduit hubs in a circular array, and a dual-function strain-relief and ground wire connecting structure adjacent each electrical wire opening on the upper side of the base plate. The strain relief structure are arranged to centralize the wires brought into the junction box, while the ground wire connecting structure (and a bonding wire features as well) provides unprecedented convenience of termination from the centralized wire connections. The strain relief, ground wire, and bonding wire features (as well as cover member installation on the base plate) allows their use without need to horizonal access to the junction box, access, vertically downward from above is all that is needed. Also, the junction box is of circular plan form with features circularly arranged to provide multiple axes of symmetry in plan view, approaching a rotational symmetry, and allowing an omnipositional use of the junction box with respect to its rotational position in plan view. As a result, conduit risers at construction sites may be merely bunched at the location where the junction box is to be installed.

17 Claims, 3 Drawing Sheets

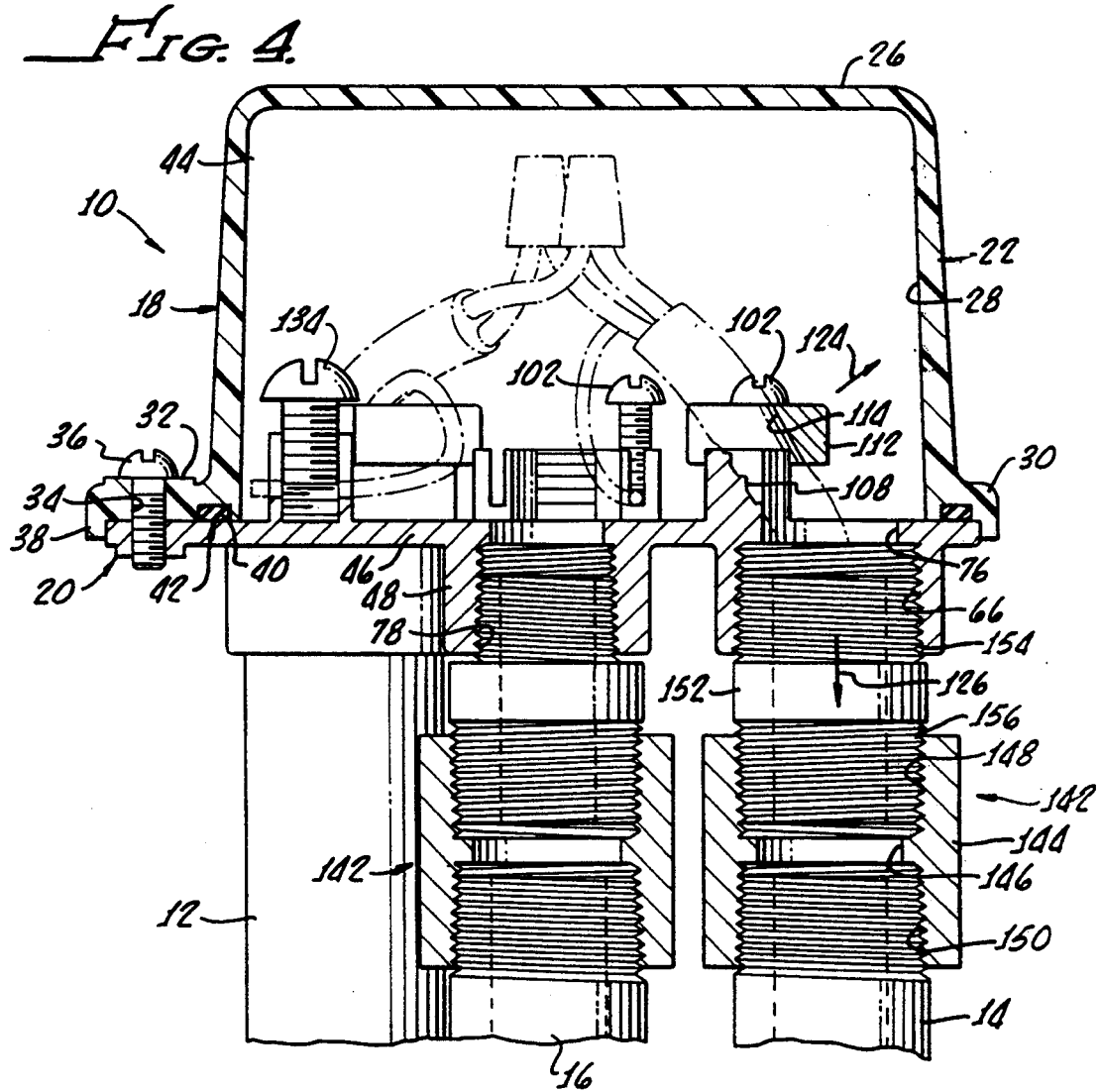

ELECTRICAL JUNCTION BOX AND METHOD OF MAKING

FIELD OF THE INVENTION

The present invention relates to protective electrical junction boxes within which electrical wiring connections may be made. More particularly, the present invention relates to electrical junction boxes which are useable for wiring installations including, for example, outdoor, partially subterranean, partially underwater, or weather-exposed wiring runs, to which a variety of installation circumstances may apply, and to which stringent electrical code requirements may pertain. Still more particularly, the present invention relates to an electrical junction box which by its embodied combination, arrangement and cooperation of features allows unprecedented utility for its use in electrical wiring to light fixture installations at swimming pools.

Background of the Invention

The electrical wiring art includes many varieties of junction boxes. These junction boxes range from the simple, rather small metal or plastic variety used with conventional Romex wire for inside residential wiring, to the large, complex, and specially sealed junction boxes used in hazardous or flammable industrial environments, many times with specialized electrical cable constructions specific to the particular use. However, few electrical wiring junction box uses are more demanding than those associated with electrical installations around swimming pools. With the proximity to water, and the necessary limited access by those not skilled as electricians (for example, access by a home owner for changing a lamp in a submerged swimming pool light fixture), the usual electrical code requirements are very demanding. Particularly, the American National Standards Institute/Underwriters Laboratories, Inc., (ANSI/UL) standard for junction boxes for swimming pool light fixtures (Standard for Safety, UL 1241), includes detailed and stringent requirements relating to all of: materials of construction; environmental sealing; connections, grounding, bonding, and strain relief of wiring; voltage drop, volume, and heat dissipation; and installation integrity factors (strength of mechanical connection between conduits and the junction box, for example); all intended to insure the safety of electrical wiring to lighting fixtures at swimming pools. Further, additional national (National Electrical Code, NFPA 70), as well as differing regional or municipal electrical code requirements may all apply to a particular swimming pool light fixture installation. Thus, a multitude of differing combinations of code requirements may apply to swimming pool light fixture installations dependent on where they are located across the United States.

As a result, the electrical wiring industry has developed a very large number of standard junction boxes adapted to satisfy the generally applicable code requirements, to also satisfy the code requirements of certain locales, and to allow for a desired number of swimming pool light fixtures to be wired from the various junction boxes. Some of these junction boxes are designed for use with metal conduit (brass or aluminum, for example), while others are designed for use with nonconductive polyvinylchloride (PVC) conduit. Some junction boxes for swimming pool light installations are designed to satisfy the local requirements as to conduit size, or materials and will not satisfy the requirements of other localities. Some junction boxes are even custom designed and manufactured as ordered to satisfy the combination of code requirements of particular locales and to allow the desired number of light fixtures to be wired from the junction box. That is, some locales require the use of plural junction boxes to wire a certain number of light fixtures, while another locale may allow a single standard or custom junction box to serve the same number of light fixtures. Alternatively, the expense and necessary waiting time of having a custom junction box designed and made may mitigate in favor of using plural common junction boxes to satisfy the needs of a particular swimming pool light installation, but at the expense of additional wiring and installation expense.

In view of the above, it is easy to understand why the wiring industry has developed plural swimming pool junction box designs, which are manufactured in plural sizes to meet varying installation needs. Of course, this variety in junction box designs and sizes means a great burden in junction box inventory for manufacturers and distributors, in installation logistics to insure that the right junction box design and size is available and is used at a certain job, and in inspection of wiring installations because of the multitude of codes applicable and the challenge in determining whether the junction boxes actually used out of the multitude of boxes available do in fact satisfy the plural applicable code requirements. Of course, all of this leads to a resulting increase in the chances for error and disagreement between planners, installers, and inspectors, with resulting rework of wiring installations and loss of time and productivity.

In addition to the confusing variety of designs, sizes, and materials of swimming pool junction boxes, several available junction boxes have unfortunate features which make their use difficult in particular situations. For example, a particular box may limit installation flexibility because of its shape. That is, a rectangular junction box installed next to a wall may suggest that the length of the box parallel the wall. However, such installation requires that the electrical conduits to be connected to the box all be lined up parallel to the wall and spaced therefrom according to the positions of the conduit hubs of the junction box. Also, the junction box by its design may require the installer or electrician to have access from the side of the box which is adjacent the wall. That is, installation of the junction box, or connection of wiring therein, may necessitate horizontal manual or tool access into the junction box. Thus, yet another limitation, that of access, and others besides, are encountered with conventional junction boxes for swimming pool light fixtures when actual installation events and use environments are considered. All of these limitations of conventional junction boxes for swimming pool light fixtures are known all too well to those working in the industry. However, prior to the present invention, no junction box gave significant relief to the plural deficiencies and long-felt needs outlined above

SUMMARY OF THE INVENTION

In view of the above, the present invention provides an electrical junction box including a generally planar metallic base member which is circular in plan view and defines plural depending bosses each forming a hub for electrical conduit connection to the base member and a through bore of selected size for passage of electrical wiring from the conduits into the junction box. Adjacent each of the inner openings of the bores, the base member includes a pair of upright spaced apart stanchions and an arcuate inclined upright wall portion extending between the stanchions. The bosses, bores, stanchions and connecting wall portions are all arranged in a circular array and cooperatively define plural planes of symmetry for the junction box.

Each of the stanchions defines a vertically extending threaded bore which is available either for securing a strain relief member to the base member with a pair of screws threaded into the bores of paired stanchions, or alternatively, for attaching a ground wire thereto. In order to facilitate the attachment of ground wires, the stanchions each define a vertical slot transacting the vertical threaded bore of the stanchion, and aligned along a parallel to a radial line of the base member. A screw received in the threaded bore may at its inner end bear upon an uninsulated portion of an electrical wire which is inserted into the transverse slot thereby to trap the wire against the bottom of the slot. The strain relief member includes an inclined wall portion cooperable with the arcuate inclined wall portion of the base member to capture an electrical cable therebetween in strain-relieving relation. The base member and strain relief members define cooperating surface features which ensure transferral of strain relief and installation forces to the base member, and isolate the screw threads of the stanchions and screws from lateral strain relief forces. In order to provide for bonding wire attachment to the base member, the latter also defines an upright pillar with a vertically downwardly extending threaded bore. Similarly to the stanchions, the bonding wire pillar also includes a transverse slot paralleling a radial line of the base member. A bonding screw threaded into the pillar may similarly capture an uninsulated portion of a bonding wire in the bottom of the transverse slot.

The junction box also includes an environmental cover member sealingly cooperable with the base member to provide a weather-tight volume around the wiring connections therein. Threaded bores are defined by the base member for receiving screws passing through aligned apertures of the cover member to secure the latter to the base member. The array of cover screws is also symmetrical on the base member, and is coordinated with the array of bosses, wiring bores, and stanchions to define a gasket pathway on the base member. A groove on the cover member is congruent to the gasket pathway, and receives and O-ring type sealing member cooperable with the cover and base members.

Because of the arrangement of features outlined above, only access from above is necessary to effect strain relief or ground wire connections to the base member. The sizes, number of a particular size, and locations in the circular array of symmetry on the base member, of the conduit hubs is very carefully selected to allow the inventive junction box, in view of its other features as well, to meet applicable code requirements of very many more locales, to provide an improved flexibility and ease of installation, reduce inventory requirements, and increase the number of lighting fixtures which may be wired out of each junction box.

In view of the above, it may be appreciated that the inventive junction box provides improved flexibility of installation because its symmetry does not require any particular arrangement of the box relative to a wall or other structure, and the conduits to be connected to the junction box may simply be bunched at the location where the box is to be installed. Ease of installation is improved because only vertically downward access from above the base member is necessary to make all wiring connections, strain relief attachments, as well as ground wire and bonding wire connections to the base member. Additionally, the radial alignment of the ground wire and bonding wire slots eases insertion of the respective wires into their appropriate location. Only a slight rotation of the wrist and sliding of the wire end downwardly into a particular upwardly-open slot is required. Thereafter, the securing screw is threaded into the stanchion or bonding pillar to capture the wire end therein. The ease and durability of strain relief installation is also improved because the strain relief members and base member cooperate to isolate lateral stresses from the securing screws. In other words the screws do not tend to bind in or strip out the threads of the stanchions. These and additional advantages of the present invention may be further appreciated from a reading of the appended detailed description of a preferred embodiment of the invention, taken in conjunction with the attached drawing figures.

BRIEF DESCRIPTION OF THE DRAWINGS FIGURES

FIG. 1 provides a perspective external view of a junction box embodying the present invention;

FIG. 2 is an exploded perspective view of the junction box seen in FIG. 1, but shown at a larger scale to improve clarity of illustration, and having electrical wiring shown in phantom so as not to obstruct depiction of junction box structure;

FIG. 3 provides a plan view of a base member portion of the junction box, again having wiring shown in phantom for clarity of illustration;

FIG. 4 is a partially cross sectional side elevation view of the junction box, again having wiring shown in phantom to better depict structure of the junction box without obstruction;

FIG. 5 is an underside perspective view of a component part of the junction box, taken at line 5—5 of FIG. 2, and shown at an enlarged scale to illustrate detail of the structure, and;

FIG. 6 is a fragmentary perspective view of a portion of the base member of the junction box, shown at an enlarged scale to better depict details of the structure.

DETAILED DESCRIPTION OF A PREFERRED EMBODIMENT OF THE INVENTION

Figure 1:
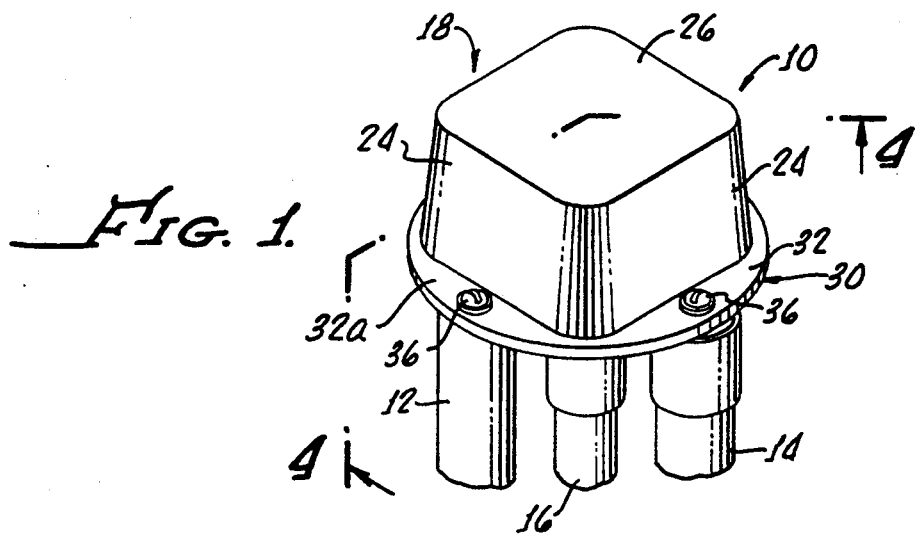

FIG. 1 depicts a junction box 10 according to a preferred embodiment of the invention. The junction box 10 is disposed at the upper end of plural (three, as depicted) electrical conduits 12–16. However, as will be seen, the junction box 10 may connect with as many as five conduits should such be required.

Figure 2:
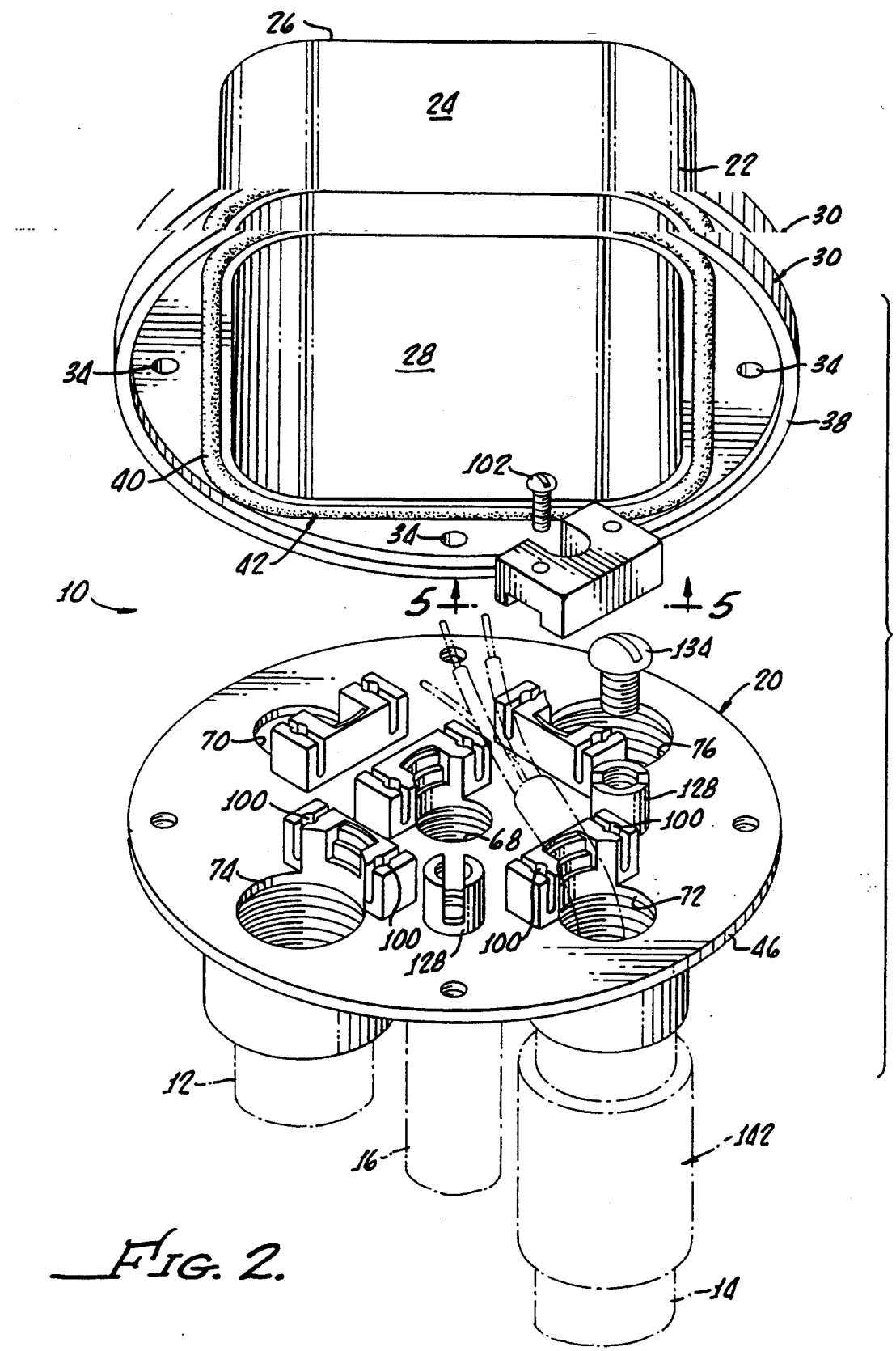

Viewing FIGS. 1, 2, and 4 in conjunction it will be seen that the junction box 10 includes a hat-like environmental cover member 18 which sealingly cooperates with a generally planar and horizontal metallic base member 20. The cover member 18 is preferably formed of molded polymer and is water proof and resistant to ultraviolet light. Cover member 18 is circular in plan view, but includes an upright upper portion 22 which is generally square in plan view and rectangular in elevation. Upright portion 22 includes side walls 24 and an upper wall 26.

Within the cover member 18 is defined a downwardly opening cavity 28 which is also generally square in cross section. A brim or flange portion 30 cooperates with the remainder of the cover member to define a shelf 32 which outwardly of the side walls 24 is of circular segment shape. Thus, the shelf 32 includes four circular segment shaped portions 32a each one outward of a side wall 24. At the center of each portion 32a, the cover member 18 defines a through bore 34 through which may pass a threaded fastener 36 for engagement with the base member 20.

At the outer periphery of brim 30, the cover member 18 includes a depending drip lip 38 overhanging base member 20 and ensuring that rain which falls on the cover 18 does not weep between the cover and base member 20. To further assure environmental protection for the junction box 10, the cover member 18 defines a downwardly opening groove 40 which is generally square with rounded corners in plan view. A resilient O-ring type seal member 42 is received into the groove 40 and is sealingly cooperable with the base member 20. It will be understood that cover member 18 cooperates with base member 20 to enclose a volume or chamber 44, viewing FIG. 4.

Viewing now FIGS. 2-6 in conjunction, the base member 20 includes a generally planar plate portion 46 which is circular in plan view. Depending from the plate portion 46, the base member 20 defines five bosses 48-56, four of which are arrayed circularly around the center one of the five. Each of the bosses 48-56 defines a respective vertically extending stepped through bore 58-66 a smaller diameter portion of each opening upwardly on the plate portion 46 in a respective opening 68-76. A larger diameter lower portion of each bore 58-66 defines a screw thread 78 of appropriate size. It will be noted that the bosses 48-56 and bores 58-66 are of differing size. That is the one boss 48 and bore 58 of smallest diameter are surrounded by four of larger diameter. The four larger diameter bosses and bores include two of intermediate size diametrically opposite one another, and two of largest size also diametrically opposite one another. Preferably the center bore 58 is sized and threaded to accept one-half inch conduit. The two intermediate size bores 60,62 are sized and threaded to connect with three-quarter inch conduit, and the remaining two bores 64,66 accept one-inch conduit.

Base member 20 also defines ten upright stanchions 80-98 disposed in spaced apart pairs adjacent each of the bores 58-66. With respect to the bores 60-66, the stanchions 84-98 are all disposed inwardly of the respective bore, as will be further explained below. Each stanchion 80-98 defines an individual vertically extending blind bore 100 which is threaded to receive a respective one of plural screws 102. That is, each of the stanchions 80-98 receives a screw 102, for a total of ten screws 102 received by base member 20. Each stanchion 80-98 also defines an individual vertical slot 104 transecting the bore 100. The slots 104 all have a depth about equal to that of the bores 100, and are each aligned parallel to a radial line with respect to the circular base member 20. Extending upward from plate portion 46 between each pair of stanchions 80-98 is a respective included arcuate wall portion 106. The wall portions 106 at their lower extent are coincident with the opening of bores 58-66 on the upper surface of plate portion 46. The wall portions 106 are inclined away from the axis of the respective bore, and define an arcuate strain-relief, cable-engaging surface 108. On the surface 108, each wall 106 also defines a pair of edged cable-engaging ridges or barbs 110.

Individually cooperable with the base member at any one of the five pairs of paired stanchions 80-98, the junction box 10 also includes a pair of identical U-shaped strain relief members 112. Because the members 112 are identical, description of one will suffice to describe both. These strain relief members 112 are U-shaped in transverse cross section to be received over the stanchions 80-98, and wall portions 106 as is best seen viewing FIG. 4. The strain relief members 112 are also U-shaped in plan view and define an inclined cable-engaging surface 114. At opposite end portions 116, the strain relief members 112 define respective spaced apart through bores 118 aligning with the bores 100 to receive screws 102. That is, the bores 100 of paired stanchions 80-98 all are spaced apart by the same distance so that the strain relief member 112 may be received at any of the paired stanchions 80-98. Importantly, the end portions 116 include a lip part 120 engaging the stanchions 80-98 opposite the strain relief surface 114. Viewing FIG. 4, it is seen that strain relief surface 108 is generally parallel with surface 114, and that both are inclined with respect to the vertical direction of stanchion 80-98 and screws 102. Thus, when the strain relief member 112 is moved downward on the stanchions 88,90, the surfaces 108 and 114 move closer together, with respect to a perpendicular to these surfaces. Viewing FIG. 4 in detail, it is seen that the reaction force from strain relief member 112 engaging an electrical cable 122 is indicated by arrow 124. The lip 120 engages the stanchions 88,90 to react to the force 124 so that this force does not result in a sideways force on the screws 102.

Also importantly, once the strain relief member 112 is firmly engaged into the jacket of cable 122, which jacket is generally a thermoplastic or thermoset polymer with yielding but shape-retaining properties, a pull force on the cable 122 (arrow 126) tends to engage the cable 122 even more firmly with the barbs or ridges 110. That is, the strain relief structure including stanchions 80-98, walls 106 with inclined surfaces 108 and edged ridges 110, cooperating with the strain relief members 112 having cooperating inclined surface 114, tends to have a self-wedging action so that the cable 122 cannot be inadvertently pulled therefrom.

Also important with respect to the remaining four paired stanchions of the plural stanchions 80-98 where one of the two strain relief members 112 is not installed is the availability and orientation of the slots 104 for receiving ground wires. Because of the circular and centralized arrangement of the base member 20 with the strain relief surfaces 108 inclined toward the center thereof, an electrician will make the wire connections in junction box 10 near the center thereof. Consequently, the grounding slots 104 which are all aligned toward the center of the base plate are naturally positioned to receive ground wire ends for grounding to the base plate 20. In use, the electrician merely lays the end of a ground wire, from which the insulation has been stripped, into the chosen slot 104, inserts the screw 102, and tightens the latter until its end captures the wire against the bottom of slot 104.

Because the junction box 10 is intended for use with two strain reliefs 112, allowing wiring of two light fixtures from the box, six grounding locations are available for ground wires. The UL standard 1241 requires swimming pool light fixtures to have grounding terminations equal to the member of conduit openings. Because junction box 10 has five conduit openings, the six available ground wire slots exceeds this requirement by one.

Figure 3:
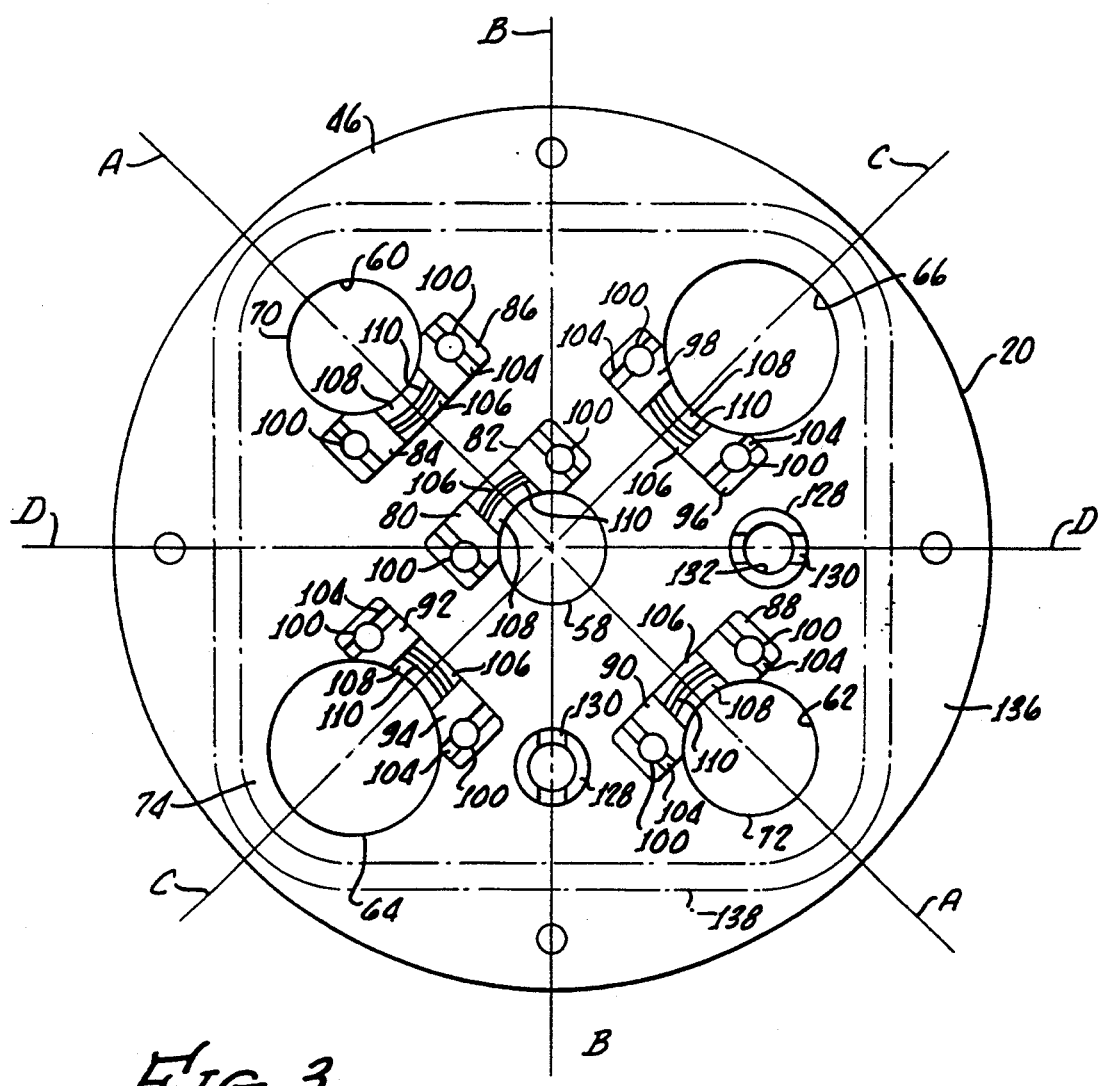

Also defined on base member 20 are a pair of pillars 128 also defining vertical cross slots 130 and threaded bores 132 receiving bonding screws 134, viewing FIGS. 3 and 6. Like the slots 104, slots 130 are aligned parallel to a radial line of the base member 20. The pillars 128 are used for securing bonding conductors to the base member in instances where non conductive conduit is used.

Finally, viewing FIG. 3, it is seen that the base member 20 includes an annular flat plateau 136 upon which the cover member 18 sets. At 138, the plateau includes a seal member path way where seal member 42 engages the base member 20. This seal member path way 138 circumscribes the openings 58-66. Also, at plateau 136, the base member 20 defines four threaded bores 140 for receiving the screws 36 securing cover member 18 to base member 20. Bores 140 are arranged in circular array like the bores 60-66. However, bores 140 are relatively rotated in their array by forty-five degrees relative to the bores 60-66.

Viewing FIG. 3, and in view of the above, it is seen that base member 20 includes plural virtual planes of symmetry, and one true plane of symmetry. That is, the vertical plane "A" through bores 70,72 is a true plane of symmetry. The halves of base member 20 on opposite sides of this plane "A" are true mirror images of one another. However, base member 20 also defines three virtual planes of symmetry "B" "C" and "D" which, but for small detail differences, would also be true planes of symmetry. This circular symmetry and centralized nature of the junction box 10 facilitates installation of the junction box adjacent structure without being constrained by box orientation. Also, only access from above vertically onto the base plate 20 and cover 18 is needed to complete wiring connections.

With respect to connection of the base member 20 to the conduits 12-16, one conduit connection to conduit 16, for example, can be effected by simply threading the base member on the conduit. Other conduit connections are effected by using an adaptor 142 seen in FIGS. 2 and 4. The adaptor 142 includes a coupling sleeve 144 having a through bore 146 with thread sections 148,150 of opposite hand. A nipple member 152 also includes end portions 154,156 with male threads of opposite hand. Thus, the nipple member 152 and coupling member sleeve 144 right-handed threads are fully screwed into the base member and onto a conduit end, respectively. Thereafter, the left-hand threads end portion and bore section of the nipple member and coupling sleeve are engaged and relatively rotated to engage these threads. Of course, the opposite right-hand threaded ends of the coupling sleeve and nipple member unscrew somewhat and base member, but sufficient thread engagement remains for secure attachment. Of course, reducing bushings may be used in the conduit hubs to facilitate use of the desired size of conduit. However, the selected sizes of conduit hubs on base member 20 meets a broad range of installation circumstances. The unused conduit hubs are simply plugged to provide complete environmental closure for chamber 44, excluding insects, vermin, and moisture.

We claim:

1. An electrical junction box comprising:
   a generally planar horizontal base member including plural depending bosses each defining a vertical through bore for upward passage of electrical wires into said junction box;
   cover means defining a downwardly open cavity and sealingly cooperable with said bore member to define a volume within which said electrical wires may be interconnected;
   said base member being generally circular in plan view and said bosses and through bores being arranged in circular array, whereby said junction box allows adaptable installation with respect to rotational position thereof in a horizontal plane;
   further including strain relief means cooperable with said base member adjacent a through bore thereof to clamp an electrical wire thereto in strain relieving relation;
   wherein said base member further includes a pair of upright spaced apart stanchion portions adjacent a through bore thereof, and an inclined arcuate wall portion extending between said stanchions;
   said strain relief means including a strain relief member which in cross section is of inverted U-shape, said strain relief member being receivable over said stanchions and wall portion at said U-shape to oppose an arcuate inclined surface portion of said strain relief member with said arcuate wall portion.

2. The junction box of claim 1 further including: dual-function strain relief and grounding wire connection means defined adjacent to a through bore thereof.

3. The junction box of claim 2 wherein said dual-function strain relief and grounding wire connection means includes an upright stanchion defined by said base member adjacent said through bore thereof, said stanchion member defining both a downwardly extending thread-defining bore, and a vertical slot transacting said stanchion and vertical bore thereof, whereby a grounding wire uninsulated portion is receivable into said slot, and a screw is receivable into said vertical bore to clamp said ground wire against said base member.

4. The junction box of claim 3 wherein said vertical slot is aligned generally parallel to a radial line of said circular base member.

5. The junction box of claim 2 wherein said dual function strain relief and grounding wire connection means includes a pair of upright spaced apart stanchion members bracketing said through bore.

6. The junction box of claim 1 wherein said strain relief means includes an inclined strain relief surface adjacent each through bore, each strain relief surface being inclined along a radial line with respect to said circular base member to centralize wiring in said junction box.

7. The junction box of claim 6 wherein said circular array of bosses and through bores includes one central boss and through bore with strain relief surface inclined radially outwardly, and a circular array of bosses and through bores around said central one with strain relief surfaces inclined toward the center.

8. An electrical junction box comprising:
   a metallic base member having a generally circular horizontal plate-like portion, said base member defining a circular array of plural depending bosses, and each boss defining a through bore opening upwardly on said plate-like portion and downwardly providing a conduit hub for said base member; said base member further including a plurality of upright stanchion portions in respective like spaced-apart pairs bracketing said bore openings, each of said stanchion portions defining a vertical thread-defining bore, and an arcuate inclined strain-relief wall spanning between said paired stanchions;

a strain relief member including a pair of end portions each defining one of a pair of vertical through bores matching said vertical bores of said paired stanchions, and a strain-relief surface generally parallel and confronting said strain relief wall, each stanchion portion further defining a vertical slot transecting said thread-defining bore and paralleling a radial line of said base member; and a respective plurality of dual-purpose strain relief and ground wire attachment screws respectively received individually in said stanchion portions, whereby said strain relief member may be attached with said screws to said base member adjacent to any one of said through bores from said plural bosses and conduit hubs, and the remainder of said screws may be employed to trap electrical wires in said vertical slots for electrical interconnection via said metallic base member.

9. The junction box of claim 8 wherein said arcuate strain relief walls are inclined toward the center of said circular base member, thereby to centralize electrical wiring relative thereto.

10. The junction box of claim 8 further including an annular plateau including a seal member path way, and a hat-like cover member cooperable with said base member to enclose a volume, said cover member defining a groove congruent with said seal member pathway, and a resilient seal member received in said cover member groove for sealing cooperation with said base member at said plateau.

11. The junction box of claim 10 wherein said hat-like cover member includes a downwardly opening polygonal cavity, said cavity having a member of sides and corners each one less than the number of said plural bosses and through bores.

12. The junction box of claim 8 wherein said strain relief member includes a dependent lip engaging said stanchion members for transferring lateral strain-relief forces thereto.

13. The junction box of claim 8 further including an adaptor having a sleeve-like complying member with thread defining end portions of opposite hand, and a tubular nipple member also having thread-defining end sections of opposite hand, the like-threaded portion and section of said coupling member and nipple member threadably engaging, while the opposite portion and section of each are threadably engageable with a conduit and with a conduit hub of said junction box, respectively.

14. A method of providing protected electrical wiring to a swimming pool light fixture, said method comprising the steps of:

forming a plate like base member of generally circular plan form with a plurality of depending bosses arrayed circularly, with each boss having a through bore opening upwardly one the base member;

leading plural electrical wires into said junction box via said through bores;

providing a dual-function strain relief or ground wire connection structure adjacent each through bore opening;

employing the dual-function structure to secure the wires to said base member in strain relieving relation at selected through bores which admit wires therethrough, and employing the dual-function structure to electrically connect ground wire of said plurality of electrical wires to said base member at selected ones of the remaining dual-function structures.

15. The method of claim 14 further including the step of also employing said dual-function structure to centralize said electrical wires relative to said base member.

16. The method of claim 15 wherein said centralizing step includes the steps of: providing each said dual-function structure with an inclined strain relief surface inclined along a radial line of said junction box, and securing said electrical wires to said base member at said inclined surfaces to guide said wires to a central disposition of said base plate.

17. The method of claim 14 further including the step of providing a hat-like cover member, and sealingly engaging said cover member with said base member about said electrical wires.

* * * * *